United States Patent [19]

Fotland

[11] Patent Number: 4,675,703

[45] Date of Patent: Jun. 23, 1987

[54] MULTI-ELECTRODE ION GENERATING SYSTEM FOR ELECTROSTATIC IMAGES

[75] Inventor: Richard A. Fotland, Holliston, Mass.

[73] Assignee: Dennison Manufacturing Company, Framingham, Mass.

[21] Appl. No.: 642,626

[22] Filed: Aug. 20, 1984

[51] Int. Cl.[4] .............................................. G01D 15/06

[52] U.S. Cl. ...................................... 346/159; 250/426

[58] Field of Search ................ 346/159; 250/324–326, 250/396 R, 398, 426; 313/361.1

[56] References Cited

U.S. PATENT DOCUMENTS 4,365,549 12/1982 Fotland ........................... 346/159 X 4,495,508 1/1985 Tarumi et al. ...................... 346/159

*Primary Examiner*—E. A. Goldberg

*Assistant Examiner*—Linda M. Peco

*Attorney, Agent, or Firm*—George E. Kersey

[57] ABSTRACT

An ion generator for the formation of electrostatic images includes two electrodes (a "control electrode" and a "driver electrode") at opposite faces of a solid dielectric member which are electrically actuated to form ions in an air region adjacent the control electrode; a third, "screen" electrode; and an additional, "deflection" electrode, which together with the screen electrode modulates ion flow to an imaging surface. Ions of a given polarity are attracted toward the imaging surface by an accelerating field resulting from a direct current potential of the control electrode. The screen electrode is maintained at a screen potential to control passage of ions through one or more apertures therein, while a further, deflection potential applied to the deflection electrode provides an additional level of control over the size, shape and location of the resulting electrostatic images. The deflection electrode may take the form of a conductive member on one side of the ion path, or two or more conductors straddling this path. This arrangement provides an additional level of multiplexing, simplifies the requirements of electronic drive circuitry, and improves image definition.

12 Claims, 8 Drawing Figures

MULTI-ELECTRODE ION GENERATING SYSTEM FOR ELECTROSTATIC IMAGES

BACKGROUND OF THE INVENTION

The present invention relates to ion generators, and more particularly, to ion generators employed for electrostatic imaging.

A wide variety of techniques are commonly used to generate ions for electrostatic imaging. Conventional approaches include air gap breakdown, corona discharges, spark discharges, and others. The use of air gap breakdown requires close control of gap spacing, and typically results in nonuniform latent charge images. Corona discharges, which are widely favored in electrostatic copiers, provide limited currents and entail considerable maintenance efforts. Electrical spark discharge methods are unsuitable for applications requiring uniform ion currents, and provide limited service life. Other methods suffer comparable difficulties.

Apparatus and methods for generating ions representing a considerable advance over the above techinques are disclosed in commonly assigned U.S. Pat. No. 4,155,093, issued May 15, 1979. The ion generator of this invention, shown in one embodiment at 10 in FIG. 1, includes two conducting electrodes 12 and 13 separated by a solid insulator 11. When a high frequency electric field is applied between these electrodes by source 14, a pool of negative and positive ions is generated in the area of proximity of the edge of electrode 13 and the surface of dielectric 11. Thus, in FIG. 1, an air gap breakdown occurs relative to a region 11-*r* of dielectric 11, creating an ion pool in hole 13-*h*, which is formed in electrode 13. This air breakdown is characterized by a faint blue glow in the discharge region, and occurs at an inception voltage of around 400–600 volts. Such devices enjoy a self-limiting discharge characteristic, and enjoy extended and reliable service as compared with ion generators depending upon spark discharges.

The ions generated by these devices may be used, for example, to create an electrostatic latent image on a dielectric member 100 with a conducting backing layer 105. When a switch 18 is switched to position X and is grounded as shown, the electrode 13 is also at ground potential and little or no electric field is present in the region between the ion generator 10 and the dielectric member 100. However, when switch 18 is switched to position Y, the potential of the source 17 is applied to the electrode 13. This provides an accelerating electrostatic field between the ion reservoir 11-*r* and the backing electrode 16. Ions of a given polarity (in the generator of FIG. 1, negative ions) are extracted from the air gap breakdown region and charge the surface of the dielectric member 100. The charge formed on dielectric 100 is seen to increase generally in proportion to the number of excitation cycles of drive potential 14. Because it is necessary in order to form an electrostatic image on dielectric 100 to have a coincident drive voltage 14 and extraction voltage 17, this device is amenable to multiplexing.

One advantageous use of the ion generator disclosed in the above patent is for the formation of electrostatic images for high speed electrographic printing. When employed for this purpose, the apparatus of U.S. Pat. No. 4,155,093 encounters certain difficulties discussed in the Background of the Invention of the commonly assigned improvement patent, U.S. Pat. No. 4,160,257. With reference to the prior art sectional view of FIG. 2, the ion generator 20 includes in addition to the above-disclosed elements an apertured screen electrode 21, which is separated from the control electrode 13 and solid dielectric member 11 by a dielectric spacer 23. This additional electrode was found necessary to cure the problem of accidental erasure of a latent electrostatic image previously formed on the dielectric surface 100. This would occur in the apparatus of FIG. 1 if a high voltage alternating potential were imposed between the control and driver electrodes, without any extraction potential applied to the control electrode 13. In this instance, any previously formed charge image on the dielectric surface 100 would create an electrostatic extraction field tending to attract ions of opposite polarity from the control aperture 13-*h*, thereby partially or completely erasing the electrostatic image. As discussed in detail in U.S. Pat. No. 4,160,257, the inclusion of screen electrode 21 has been found to prevent such accidental image erasure by imposing a screen potential 28 between the screen electrode 21 and counterelectrode 105 of the same polarity as control potential 17.

Although the apparatus of U.S. Pat. No. 4,160,257 allows a fair degree of control over the size and shape of electrostatic images formed thereby, it suffers certain shortcomings. This is particularly true as respects the placement of the image. As is well known in the various printing technologies which rely on dot matrix imaging, it is highly advantageous to enhance the precision of locating the image elements, i.e. resolution. During the normal operation of U.S. Pat. No. 4,160,257, the image raster is defined by the length of the ion generator and the number of drive and control lines. Typical figures for these parameters are 20 drive lines, 128 control lines and an ion generator extent of 8.53 inches, which represents a resolution of approximately 300 dots per inch. Although this image density has been found reasonably satisfactory, it would be advantageous to increase the dot density beyond the limitations imposed by imaging speed. By increasing the density of the image raster, a commensurate improvement is achieved in the image quality range of this electrostatic imaging system.

Accordingly, it is a primary object of the invention to provide improved ion generating devices for the formation of electrostatic images. A principal related object is to improve the imaging capabilities of such systems while increasing the efficiency thereof.

Another object of the invention is to simplify the requirements of the driving electronics for such systems. This plays an important practical role, by reducing the cost of these systems.

A further object is to broaden the imaging capabilities of such electrostatic imaging systems. Specifically, it is desirable to be able to provide a variety of character fonts as well as a broadened tonal range.

SUMMARY OF THE INVENTION

The above and additional objects are satisfied by the electrostatic imaging devices of the invention, which include two electrodes (herein termed "control" and "driver" electrodes) on opposite faces of a solid dielectric member, and further include an apertured screen electrode, as well as a deflection electrode downstream of the screen electrode. Ions are generated in an air region adjacent the control electrode and solid dielectric member using high amplitude time-varying potentials between the control and driver electrodes, and ions of a particular polarity are attracted toward the imaging surface due to a direct current potential of the control electrode. The resulting ion flow is modulated by the screen and deflection electrodes. The screen electrode provides gating and electrostatic lensing functions as disclosed in U.S. Pat. No. 4,160,257, while the deflection electrode acts primarily to selectively induce a desired transverse redirection of the ion flow. The deflection electrode, in certain instances, also modifies the size and possibly the shape of the resulting electrostatic image.

In a basic embodiment of the invention, a single deflection electrode located at one side of the ion path acts either to attract, repel, or leave uncharged the ion stream, in accordance with the deflection potential. Typically, the screen potential and deflection potential comprise direct current voltages of the same polarity as the control potential. Relative to a reference level established at a counterelectrode, the deflection potential, screen potential, and control potentials assume respectively increasing absolute values in order to achieve a "print" condition. The degree of attraction or repulsion exerted by the deflection electrode depends on the relative magnitudes of the deflection and screen potentials, and there exists at least one critical value of the deflection voltage at which it will have essentially no effect on th flow of ions.

Another aspect of the invention relates to the effect of the deflection potential on the size of the electrostatic image. In the basic embodiment of a single deflection electrode, the image diameter will tend to decrease at greater degrees of repulsion, due to a reduction of the net extraction field. This may be overcome by providing a compensating adjustment of the control potential.

In another embodiment of the invention, a pair of deflection electrodes with independent potentials straddle the ion stream to achieve a "push-pull" effect. Deflection of the ion stream toward one of the deflection electrodes is achieved by the combination of the attraction potential of that electrode and the repulsion potential of the opposite electrode. This arrangement reduces or eliminates undesirable variations in the size of the electrostatic image due to reduction of the ion accelerating field. This embodiment may be extended to more than two deflection electrodes, each having a separate potential source, thereby providing an additional dimension of deflection.

Yet another aspect of the invention relates to the geometry of the various electrodes in a multielectrode, dot matrix electrographic printing head. The control and driver electrodes advantageously take the form of transversely-oriented line electrodes, with an array of ion generation sites at electrode crossover locations. In order to compensate for relative movement of the printing head and imaging surface, taking into account the raster scan timing of the drive electronics, these line electrodes are typically oriented at an acute angle relative to each other. In this embodiment, the deflection electrodes may be given a stepped profile in order to provide an orthogonal deflection characteristic.

A further aspect of the invention is the mode of operation of the deflection electrode. This electrode may operate in an analog mode, i.e. over a continuous range of deflection potentials with commensurate control over image location. Alternatively, this device may be utilized in a switching mode, by establishing two or more reference levels of the deflection potential corresponding to a plurality of predetermined imaging states. When operated in the latter mode, the apparatus of the invention considerably simplifies the requirements of the driving electronics needed to achieve a desired image raster.

A further embodiment of the invention incorporates the same ion generation structures (i.e. control and driver electrodes and solid dielectric member) but utilizes a split screen electrode to provide a multiplicity of deflection states. In this embodiment, the screen electrode of U.S. Pat. No. 4,160,257 is repalced by two independent electrodes which are separated by a slot to permit passage of ions. A potential difference between the split screen electrodes induces a deflection of the ion stream emerging from the screen aperture. This apparatus may be operated in a switching mode by alternating the first and second screen potentials to the split electrodes.

BRIEF DESCRIPTION OF THE DRAWINGS

The above and additional aspects of the invention are illustrated in the detailed description of the preferred embodiment which follows, to be taken in conjunction with the drawings in which.

DETAILED DESCRIPTION

Figure 3:
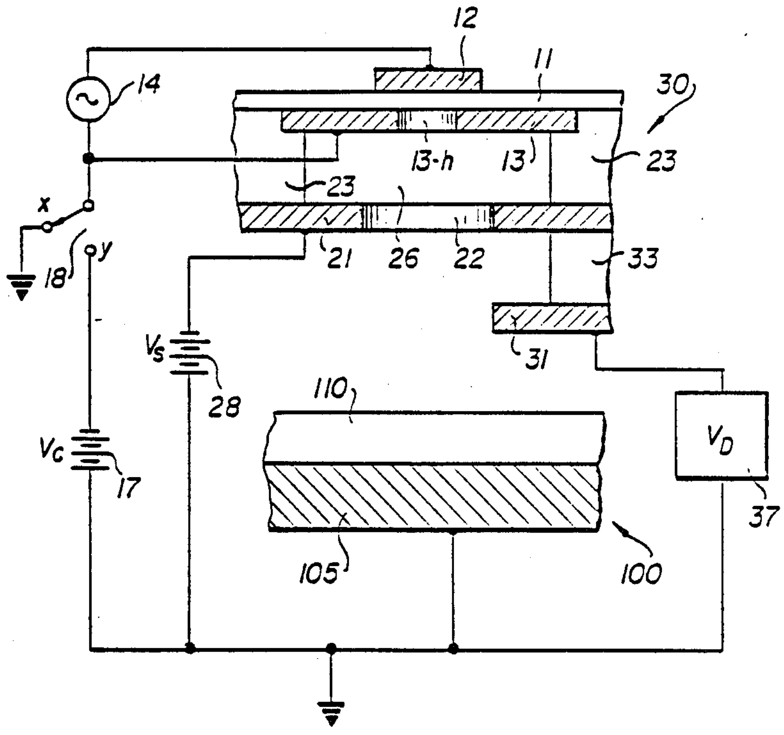
FIG. 3 is a sectional schematic view of an ionemitting printing head in accordance with a preferred embodiment of the invention, as utilized for electrostatic imaging.
Figure 4:
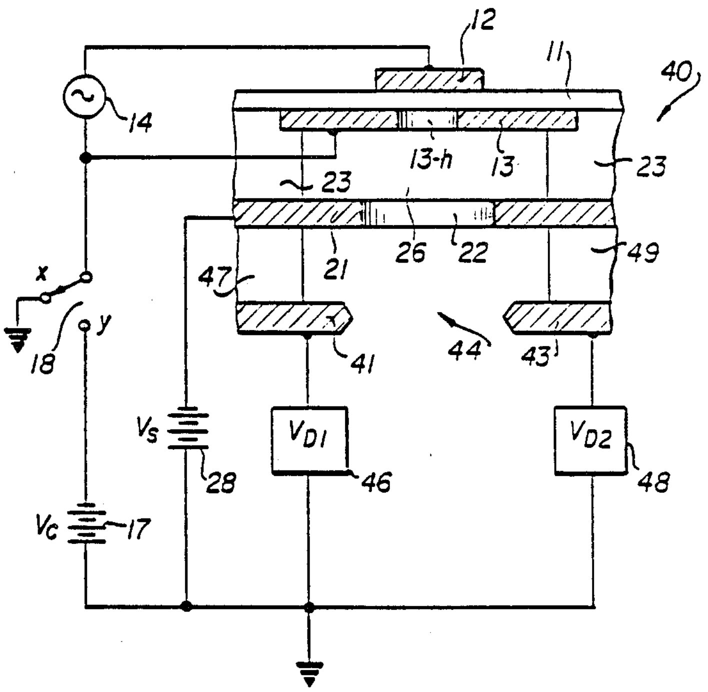
FIG. 4 is a partial sectional view of an electrographic printing head according to a further embodiment of the invention.

Reference should now be had to FIGS. 3 and 4, which illustrate a basic version of the ion-beam deflection electrographic device of the invention. FIG. 3 shows in somewhat schematic form a single ion projection site of a printing head 30, located adjacent an imaging member 100 to form latent electrostatic images on a dielectric surface layer 110. The printing head 30 includes a control electrode 13 and driver electrode 12, placed on opposite sides of a solid dielectric member 11; a screen electrode 21 which is separated from the control electrode 13 by dielectric spacer layer 23; and a deflection electrode 31 which is electrically isolated from screen electrode 21 by dielectric spacer layer 33. Ions are formed in the air region 13-*h* defined by control electrode 13 and dielectric 11 by virtue of a high voltage timevarying potential 14 imposed between the control electrode 13 and driver electrode 12. As in the prior art devices discussed above, ions of a predetermined polarity are attracted from air region 13-*h* toward imaging surface 110 due to the direct current "control potential" 17 placed between control electrode 13 and counterelectrode 105. Thus, ion flow is modulated by the influence of screen electrode 21 (which receives screen potential 28) as is the case in the apparatus of U.S. Pat. No. 4,160,257; and in the device of FIG. 3 is subject to the further electrostatic influence of deflection electrode 31 which is located at one side of the ion path.

Deflection electrode 31 receives the direct current "deflection potential" 37, which provides a number of significant effects in determining the electrographic imaging characteristics of the device 30. Employing the symbols $V_C$, $V_S$, and $V_D$ to signify respectively the control, screen, and deflection potentials, it is generally advantageous that these potentials be of like polarity and of respectively decreasing amplitude (considering the counterelectrode 105 as grounded) in order to permit passage of the ion stream to the dielectric receptor surface 110. Subject to this restraint, the deflection potential 37 may be regulated so that the deflection electrode 31 repels, attracts, or acts neutrally toward the ion stream emerging from screen aperture 22. This permits the user to control the placement of the electrostatic image on surface 110 along the axis of deflection—a capability which provides significant advantages well known in the art of dot matrix printing. It has generally been observed that the apparatus of FIG. 3 gives more accurate control over ion deflection when ions are repelled by electrode 31, than when they are attracted.

The deflection field arising from electrode 31 produces additional effects which must be taken into consideration in the operation of this device. This field may cause a net increase or decrease of the accelerating field which attracts ions toward dielectric surface 110, and accordingly may cause an enlargement or contraction of the resulting electrostatic iamging. In the embodiment of FIG. 3, when ions are repelled by deflection electrode 31 this will tend to reduce the size of the electrostatic image. In order to compensate for this effect, the control voltage $V_C$ may be increased to restore the image to its desired size. As mentioned above, under certain electrical conditions the deflection electrode may totally cut off the flow of ions.

The apparatus of the invention may be operated in an analog mode, to provide a continuous range of image locations, or a switching mode, to provide two, or a limited number, of alternative image locations. When operated in the latter arrangement, these electrographic printing heads generate predefined digital rasters with simplified, economical requirements for the control electronics, due to the additional level of multiplexing achieved by the deflection electrodes.

FIG. 4 gives a partial schematic sectional view of an ion-emitting print head 40 according to a further embodiment of the invention. As compared with the apparatus of FIG. 3, that of FIG. 4 adds an additional deflection electrode on the opposite side of the ion path; electrodes 41 and 43 each receive and independent deflection potential, respectively provided by sources 46, 48. Deflection potentials $V_{D1}$ and $V_{D2}$ create a push-pull electrostatic effect on the intervening ion stream, whereby any deflection of the ions is attributable to the influence of both electrodes. This embodiment thereby reduces or eliminates the tendency toward enlargement or contraction of the electrostatic image as a function of the image placement.

Figure 5:
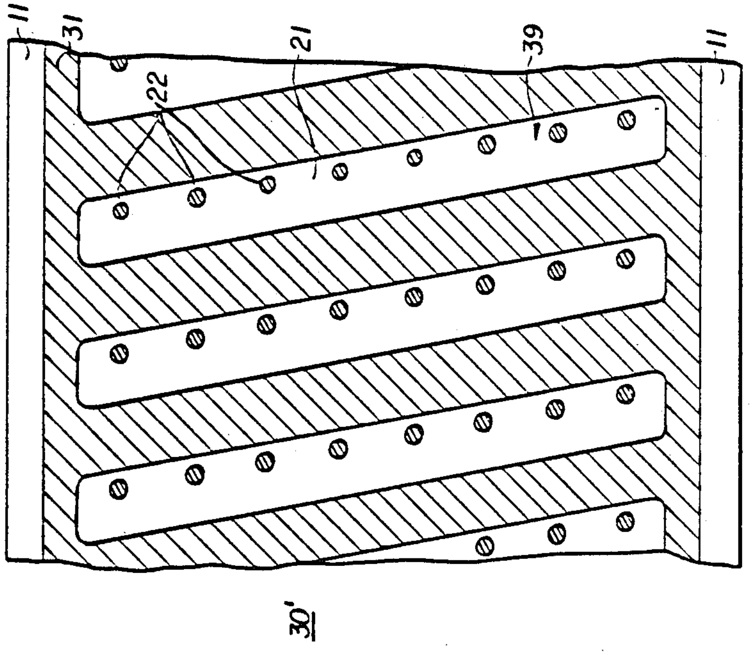
FIG. 5 is a plan view of a dot matrix printing head of the type shown in FIG. 3.

FIG. 5 shows in a partial plan view an advantageous design of dot matrix printing head 30' utilizing the electrode arrangement of FIG. 3. Printing head 30' here viewed from the direction of ion projection, includes columns of screen apertures 22 in an array of screen electrodes 21, which are seen within elongated slots 39 defined by an integral deflection electrode 31.

Figure 6:
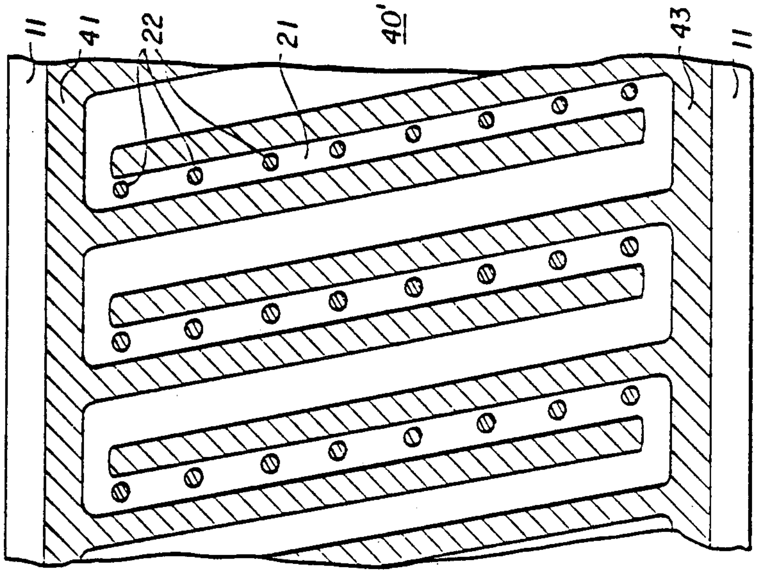
FIG. 6 is a plan view of a dot matrix printing head of the type shown in FIG. 4.

FIG. 6 is a partial plan view of a dot matrix printing head 40' of the type shown in section in FIG. 4. Printing head 40' includes an array of interleaved deflection electrodes 41 and 43, placed astride columns of screen apertures 22.

Figure 8:
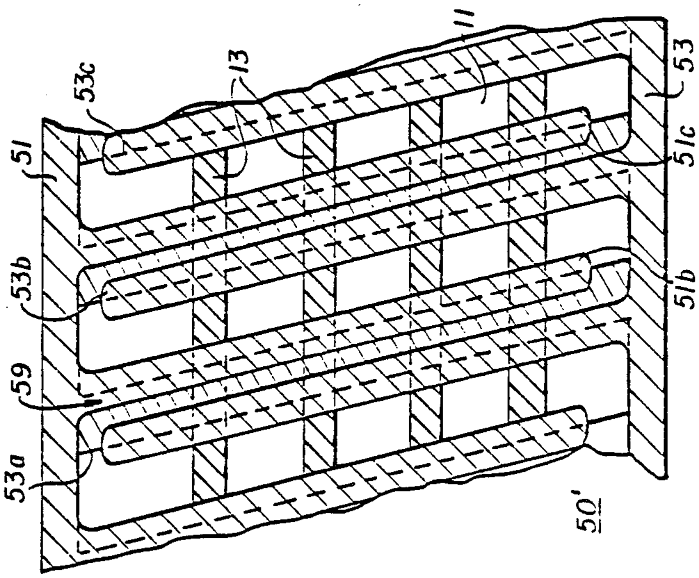
FIG. 8 is a plan view of the printing head of FIG. 7.
Figure 7:
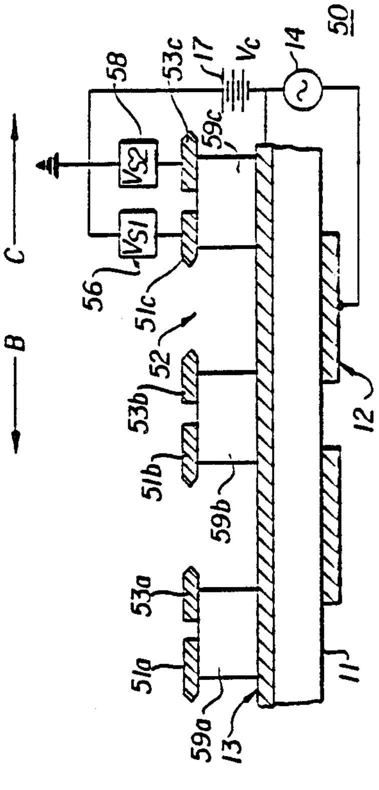
FIG. 7 is a partial sectional schematic view of an electrostatic printing head according to yet another embodiment of the invention.

FIGS. 7 and 8 illustrate an alternative ion-deflection scheme according to the invention. As seen in section in FIG. 7, ion projection device 50 includes the same control electrode 13, driver electrodes 12, and solid dielectric 11 as incorporated in the apparatus discussed above. Ion generator 50 substitutes for the single screen electrode 22 of FIGS. 2-6, split electrodes 51, 53. Electrodes A given pair of split screen electrodes 51*c*, 53*c* are electrically isolated from each other and receive distinct screen potentials $V_{S1}$ $V_{S2}$ respectively provided by sources 56 and 58. Ions generaed in the air region 56 are extracted due to the accelerating field generated by the control potential $V_C$, subject to the influence of opposing screen electrodes 53*b*, 51*c*. Providing a potential difference between the opposing screen potentials creates a net deflection field, thereby inducing a transverse component B or C in the ion projection course.

FIG. 8 shows in a plan view a matrix printing head 50' utilizing the electrode geometry of FIG. 7. Printing head 50' icorporates an array of interleaved screen fingers 51, 53 supported by dielectric spacer blocks 59*a*, 59*b*, etc. Ions are generated at selected crossover sites of control lines 13 and drive lines 12, and extracted subject to the moderating influence of a pair of opposing screen electrodes 51, 53, as discussed above.

Figure 1:
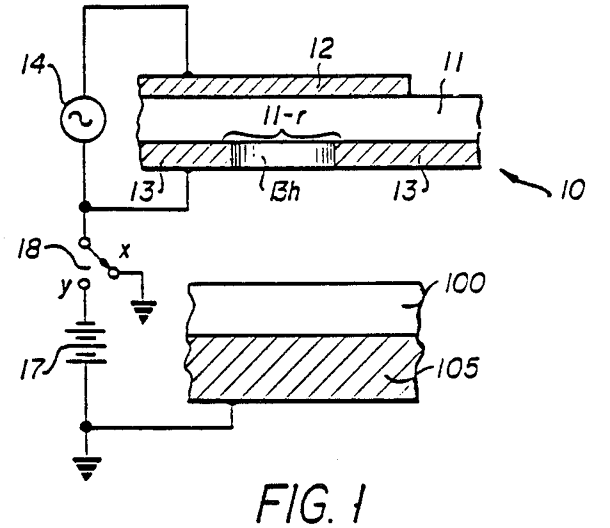
FIG. 1 (PRIOR ART)
FIG. 1 is a sectional schematic view of an ionemitting printing head as used for electrostatic imaging, as known in the prior art.
Figure 2:
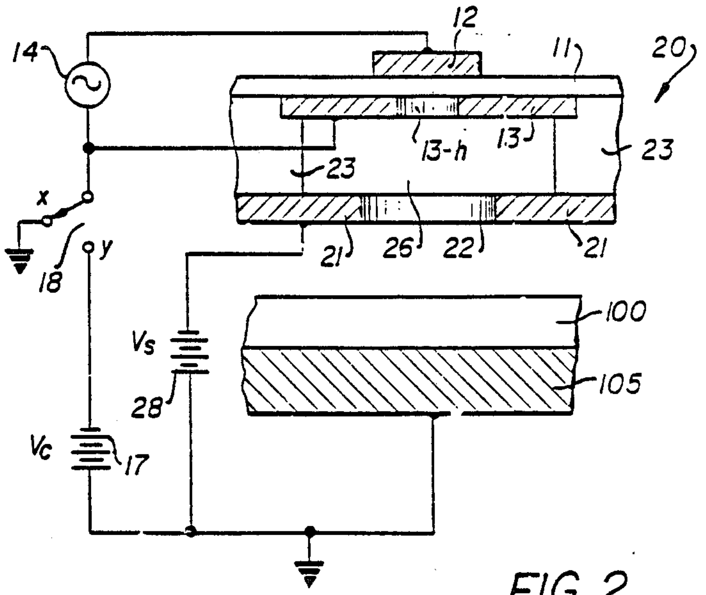
FIG. 2 (PRIOR ART)
FIG. 2 is a sectional schematic view of a threeelectrode ion-emitting printing head as known in the prior art, representing an improved version of the printing device of FIG. 1.

FIG. 9 illustrates an alternative deflection electrode geometry in a partial plan view of a printing head 60', of particularly utility in connection with the digital raster scan arrangement of commonly assigned U.S. Ser. No. 446,821. Printing head 60' incorporates an array of stepped deflection electrodes 61. Individual steps 69 of deflection electrodes 61 are oriented perpendicularly to corresponding drive lines 12 (shown in phantom) on the opposite face of printing head 60. The ion generation sites of a given drive line 12 are energized simultaneously to effect ion deposition on the dielectric surface 100 (FIG. 2). Control electrodes 13 (not shown) are oriented at an acute angle with respect to drive lines 12 inasmuch as printing head 60 moves relative to the imaging surface 100 to provide a compensating offset of the ion deposition locations, as described in Ser. No. 446,821. It is therefore desirable to provide a stepped profile of deflection electrodes 61 in order that individual steps 69 will be perpendicular to the raster axes defined by drive lines 12.

While various aspects of the invention have been set forth by the drawings and the specification, it is to be understood that the foregoing detailed description is for illustration only and that various changes in parts, as well as the substitution of equivalent constituents for those shown and described, may be made without departing from the spirit and scope of the invention as set forth in the appended claims.

I claim:

1. Improved Electrographic Imaging Apparatus including:

control and driver electrodes at opposite sides of a solid dielectric member;

a time varying potential applied between said electrodes to generate ions in an air region adjacent to the solid dielectric member and a driver electrode;

an accelerating control potential applied between a control electrode and a counterelectrode to attract ions of a particular polarity from said air region to an imaging surface, and;

a screen electrode which modulates the flow of ions to form electrostatic images and is maintained at a screen potential relative to a counterelectrode;

wherein the improvement comprises:

matrix imaging, parallel arrays of control and drive line electrodes located on opposite faces of a flat dielectric member and transversely oriented to one another, including a corresponding array of deflecton line electrodes comprising an interleaved series of finger electrodes maintained at a deflection potential to selectively deflect ions, with first and second deflection potentials respectively applied between the screen electrode and an imaging surface to alternating deflection electrodes located adjacent to the ion path.

2. Apparatus as defined in claim 1 wherein the deflection potential, screen potntial, and control potential have respectively increasing absolute values relative to a reference potential applied to a counterelectrode.

3. Apparatus as defined in claim 1 wherein ions are attracted toward said deflection electrode while passing thereby.

4. Apparatus as defined in claim 1 wherein ions are repelled from said deflection electrode while passing thereby.

5. Apparatus as defined in claim 1 wherein the control potential is adjusted in accodance with said deflection potential to achieve a desired size of electrostatic images formed on said imaging surface.

6. Apparatus as defined in claim 1 including a plurality of deflection electrodes straddling the ion path, wherein each of said deflection electrodes receives an independent deflection potential to provide an aggregate electrostatic field.

7. Apparatus as defined in claim 1, wherein the control electrodes are oriented at an acute angle relative to the drive lines, for imaging onto a relatively moving imaging surface moving along the axis of said drive lines, wherein the deflection electrodes have a stepped profile including a series of steps perpendicular to the axis of said drive lines.

8. Apparatus as defined in claim 1, for digital matrix imaging, further including means for controlling said deflection potential to provide a plurality of discrete deflection states.

9. Apparatus as defined in claim 1, further including means for controlling said deflection potential to provide an essential continuous range of deflection states.

10. Apparatus as defined in claim 1 wherein each of the screen potentials is of the same polarity but of a lesser amplitude than said control potential relative to a reference potential applied to a counterelectrode.

11. Apparatus as defined in claim 1, wherein the screen electrodes are mounted in pairs to dielectric spacer members which separate the screen electrodes from the control electrodes.

12. Improved electrographic imaging apparatus including:

control and driver electrodes on opposite sides of a solid dielectric member, with a time varying potential applied between said electrodes to generate ions in an air region adjacent the solid dielectric member and driver electrode;

an accelerating potential applied to the control electrode to attract ions of a particular polarity from said air region to an imaging surface and a screen electrode to form latent electrostatic images; maintained at a screen potential;

wherein the improvement comprises:

first and second screen electrodes straddling the ion path between the air region and the imaging surface, which respectively receive first and second screen potentials to permit passage of ions at a selected transverse deflection toward one of the screen electrodes; and means for digital matrix imaging comprising arrays of drive lines and control lines transversely oriented to one another, on opposite flat faces of said dielectric member, with ion generation sites at electrode cross-over points and said screen electrodes constituting an interleaved array of finger electrodes separated from the control lines by dielectric spacer elements.

* * * * *